United States Patent [19]

Peterson

[11] 3,892,083

[45] July 1, 1975

[54] RELEASE MECHANISM

[76] Inventor: Carmen A. Peterson, 38 Pilot Pl., New Port Richey, Fla. 32355

[22] Filed: Jan. 11, 1974

[21] Appl. No.: 432,579

[52] U.S. Cl. ............................. 43/43.11; 43/43.12
[51] Int. Cl. ........................................ A01k 91/00
[58] Field of Search .............. 43/43.12, 43.11, 44.87

[56] References Cited
UNITED STATES PATENTS

| | | | |
|---|---|---|---|
| 2,838,866 | 6/1958 | Labin | 43/43.12 |
| 3,136,086 | 6/1964 | Morrison | 43/43.12 X |
| 3,303,598 | 2/1967 | Spindler | 43/44.87 X |

Primary Examiner—Warner H. Camp
Assistant Examiner—Daniel J. Leach
Attorney, Agent, or Firm—Stein & Orman

[57] ABSTRACT

A release mechanism primarily designed to be used in connection with fishing lines and particularly adapted to be mounted on an outrigger type structure. The release mechanism comprises a body including a holding means connected thereto or mounted thereon and specifically configured to detachably engage a bead-like member secured directly to the line wherein the holding means movably engages a tension adjusting means which is oriented to the holding means such that its position and movement regulates the configuration of the holding means and thereby determines the clamping force with which the holding means engages the bead-like element of a line engaging means or hinders its removal. The line engaging means may be in the form of a bead and connecting eyelet, a disposable one piece locking means fixedly attaching the line thereto or a bead-swivel-eyelet combination wherein the eyelet is allowed to move relative to the bead and the body of the release mechanism. One embodiment of the outrigger structure comprises a substantially elongated hollow tube having outwardly extending fingers attached at opposite ends of the outrigger structure. The housing of the release mechanism is integrally or permanently attached to the outrigger at its approximate center thereof.

5 Claims, 13 Drawing Figures

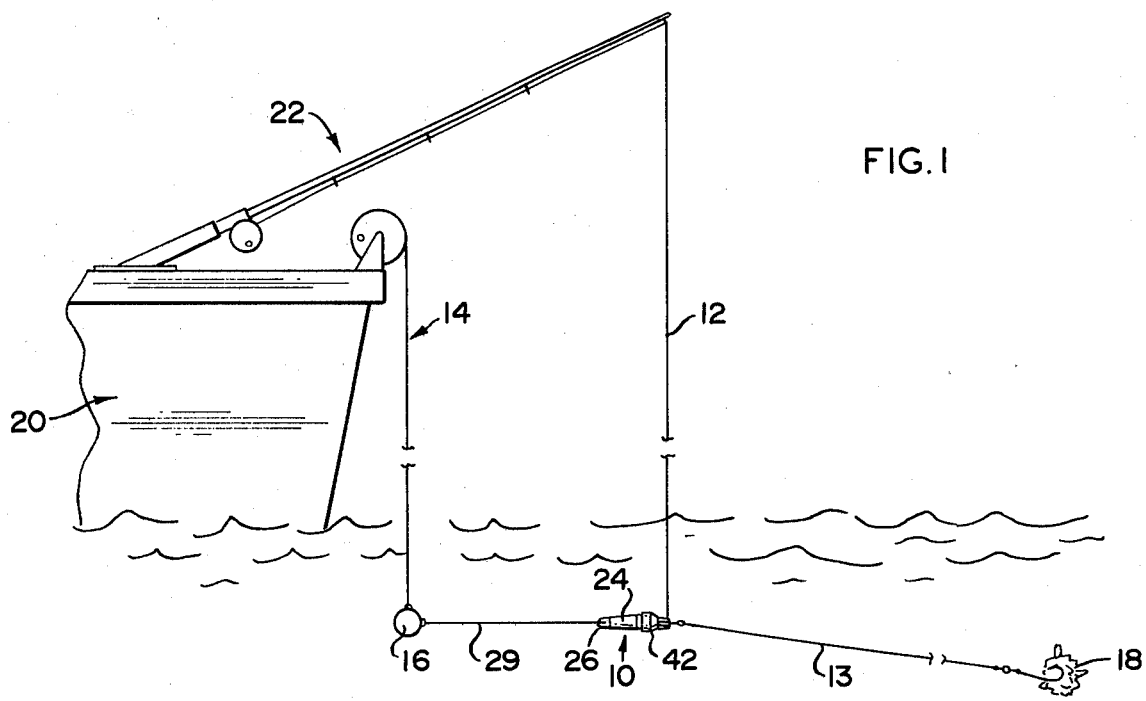
FIG. 1
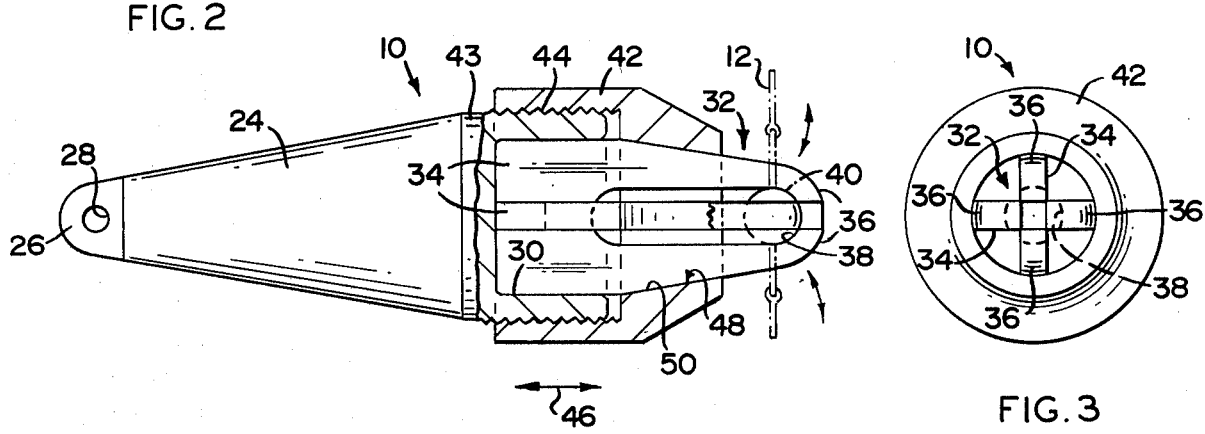
FIG. 2
FIG. 3
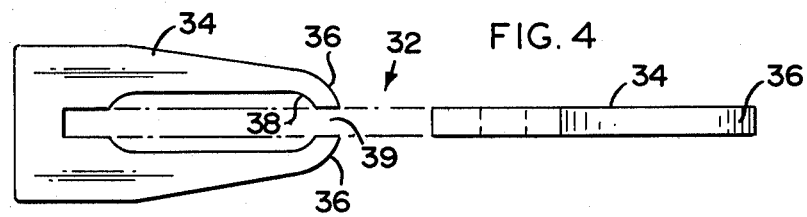
FIG. 4
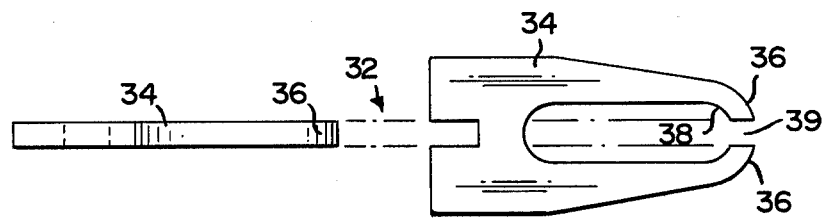
FIG. 5

RELEASE MECHANISM

BACKGROUND OF THE INVENTION

1. Field of the Invention

This invention relates to a release mechanism primarily designed to be used in combination with any type of fishing cord, line, cable or the like and mounted on an outrigger structure such that the line is oriented in a desired position and upon a predetermined force being applied to said line it is set free from the release mechanism.

2. Description of the Prior Art

In the area of sport fishing there exists a number of problems directly associated with the placement of a fishing line from a conventional rod and reel arrangement. A number of commonly known devices are utilized to position the line and the bait in a desired location during trolling or movement of the boat. It is quite well known to use such devices such as outriggers, deep trolling weight assemblies and the like.

However, the common problem associated with each of these devices is an efficient means of quickly releasing the fishing line from the positioning device at a predetermined pressure or force when a fish hits or takes the bait. Such a release mechanism must act on a quick release basis so that the bait will properly react in the intended manner when the fish comes in contact with it. By the same token, an efficient release mechanism must be designed to hold the line in a desired position against the force of the water on the bait as the boat is traveling.

A number of release mechanisms of one type or the other have been developed and are commercially available, which attempt to provide efficient means of releasing a fishing line from a positioning device such as an outrigger. However, the majority of these devices are overly complicated and structured such that their initial cost is often prohibitive thereby making it very costly if the device is inadvertently lost during the release process. Some of these devices are shown in the patents to Schneider U.S. Pat. Nos. 2,749,648; Terilli 3,462,870; Kling 3,518,784 and Ulsh 3,091,885.

Generally, the patents cited above are descriptive of prior art devices wherein a hook may be dislodged from the remaining tackle on the line if the hook is snagged on a rock or other article and cannot readily be released. Similarly, Schneider and Terilli disclose various release mechanisms having to do with fishing lines and the like which basically include a type of clip or pivoted arm arrangement.

The U.S. Pat. Nos. to Ritter, 3,659,370 and Ulsh 3,091,885 are also directed to release type mechanisms but neither are particularly adapted to be mounted on or used in combination with an outrigger structure. Also, due to their complexity, these structures may suffer from inherent problems existing in the prior art.

A review of these prior art references as well as the other devices commonly used in fishing point out the fact that the devices are either overly complicated and thereby cost too much or alternately various "home made" devices are often used which are not efficient and do not consistently accomplish the quick release and effective positioning of the line and bait as intended.

Other problems associated with the prior art devices are the easy positioning and securing of the line to the positioning device. Generally the user is required to disassemble or relocate the positioning device, install the release mechanism thereon, connect the release mechanism in some manner to the line itself and then reposition the entire assembly in the desired location to properly orient the bait and fishing tackle when in use.

Accordingly, it is obvious that there is a need for a quick release mechanism intended to be used in combination with a line, such as a fishing line but also versatile enough to be used with a line, cable, rope or any similar application wherein such a line is needed to be quickly released. Such a device should be of relatively simple design and manufacture such that its initial cost and any cost of maintenance will not be particularly high. In addition, such a device should be durable and long lasting even in the rather harsh, corrosive environment of salt water.

SUMMARY OF THE INVENTION

The present invention relates to a line releasing mechanism of the type which may be used for the quick release of fishing lines in deep sea sport fishing wherein the line is attached to a positioning device such as an outrigger. While the present invention will be discussed primarily in the environment of sport fishing it should be readily recognized that the subject release mechanism in the embodiments described could be readily adapted to any application wherein a line or equivalent element is intended to be originally prepositioned in a desired location and then quickly released upon the application of force to the line.

More particularly, the release mechanism comprises a body having a connecting means located at one end for connecting the body of the device to any positioning facilities such as an outrigger as mentioned above. The body is specifically configured to have connected thereto a holding means. This holding means is positioned on the body so as to directly and movably engage a tension adjusting means which is part of the body itself. The tension adjusting means is intended to move relative to the holding means thereby regulating the amount of tension with which the holding means engages a line engaging means or member to be described hereinafter.

One embodiment of the present invention is directed to a holding means in the form of one or more plates wherein each plate comprises a plurality of movable fingers arranged in spaced relation to one another. More particularly, at least two of the plurality of fingers which may be formed on each plate are arranged in opposed, substantially co-planar relation to one another. In this embodiment, the tension adjusting means comprises a sleeve apertured at one end so as to allow a portion of the finger of each plate to extend therethrough and be exposed to the exterior of the body. The sleeve is telescopically arranged to the remainder of the body and threadedly attached thereto. The aperture in the sleeve is configured to slidingly engage the exterior finger. As the sleeve is tightened relative to the remainder of the body the fingers are forced closer together by applying a greater holding force to the line engaging means and in turn requires a greater force to remove this line engaging means from the finger.

When the holding means comprises a plurality of plates, the fingers of each of the plates are cooperatively positioned so as to form a housing or "socket" for the bead of the line engaging means. As stated above, each of these fingers are arranged relative to the tension adjusting means such that its position regulates the closeness of the fingers to one another and accordingly, the amount of force required to remove the bead portion of the line engaging element from between the fingers and out of the housing which they define.

With regard to any of the embodiments of the holding means utilized, the line engaging means will generally comprise a bead member interconnected to a line engaging element. One embodiment of the present invention further includes a swivel means interconnected between the bead and an eyelet whereby the line is freely movable relative to the line engaging means and the eyelet, by virtue of the swivel means, and is rotatable relative to the bead which is detachably secured by the holding means as described above. Another embodiment of the line engaging means comprises a substantially V-shaped member wherein the free extremities or ends of each leg of the V is somewhat bulbous or hemispherical shape such that when brought together they form a "split bead" which is designed to fit within the housing of the holding means. The legs of the V are hinged together at the opposite extremity or apex of the V and the legs of the V may be brought together in substantial engagement with one another along each of the legs entire length. The line is clamped between these legs and are substantially locked therein when the bead is within the holding means.

Yet another embodiment of the present invention includes the body comprising a pair of legs fixedly attached together at correspondingly positioned extremities of the leg and split or spaced apart at the opposite extremity. This opposite, spaced apart end of the body is formed into a specific configuration thereby defining the holding means of the body. This holding means is again adapted to detachably engage a bead or bead portion of the line engaging means as described above. A tension adjusting means is considered part of this body and may be in the form of a screw threaded fastener which also may be spring biased such that rotation of the fastener causes the legs to move closer together or further apart thereby regulating the clamping or gripping force with which the legs of the body engage the bead of the line engaging member.

Yet another embodiment of the present invention comprises the release mechanism being integrally or permanently attached to an outrigger, wherein the outrigger comprises an elongated hollow tube. The tube includes an outwardly extending finger each arranged in spaced relation and dimensioned to have the fishing cord "wrapped" around the fingers. Unwrapping of the cord therefrom occurs by the proper force being exerted on the cord or line thereby causing the line engaging means to be disconnected from the release mechanism.

The release mechanism comprises the body having a plurality of gripping fingers integrally formed thereon and defined by one or more slots oriented in the body contiguous to the gripping fingers. Adjusting means is in the form of an integrally threaded annulus movably engaging the threaded outer surface of the body and integrally formed ribs.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings, in which:

FIG. 1 is a perspective view of the present invention attached to a positioning device which could represent an outrigger, deep trolling assembly or the like.

FIG. 2 is a partial sectional view showing the interior of the body and details of the holding means.

FIG. 3 is an end view of the structure of FIG. 2.

FIGS. 4 and 5 are exploded, detailed views of the holding means as shown in FIG. 2.

Similar reference characters refer to similar parts throughout the several views of the drawings.

DETAILED DESCRIPTION

Figure 6:
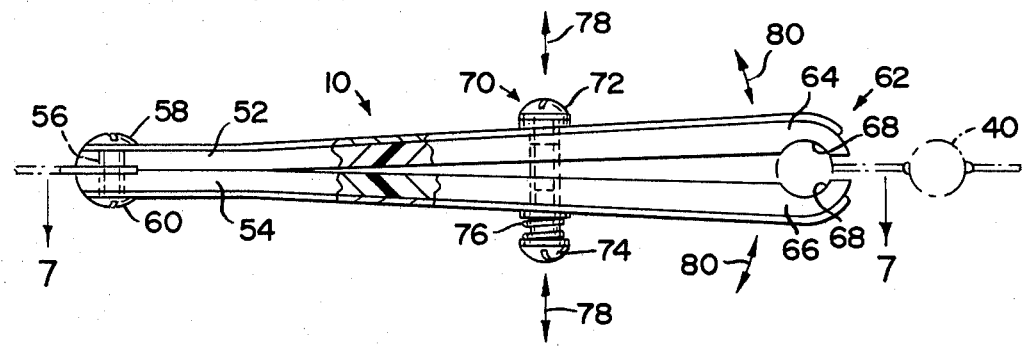
FIG. 6 is a side, partial sectional view of another embodiment of the body of the release mechanism of the present invention.
Figure 7:
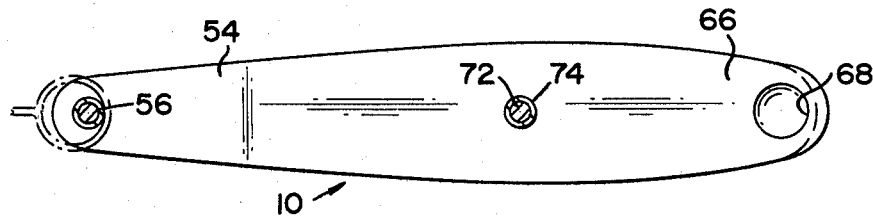
FIG. 7 is a view taken along lines 7—7 of FIG. 6.

This invention relates to a line release mechanism generally indicated as 10 in FIGS. 1, 2 and 6. As clearly shown in FIG. 1, the device 10 may be used in combination with a fishing line 12 by it being attached to a fishing line positioning means 14. The positioning means 14 as shown in FIG. 1 could take many forms such as an outrigger, fish kite or any other similar positioning means commonly known in the sport fishing industry. The particular positioning device 14 shown represents a deep trolling assembly wherein a weight 16 has connected thereto the release mechanism 10 so as to properly position the bait 18 a sufficient depth below the surface of the water and a sufficient space relative to the boat or other water craft 20 which is carrying the fisherman. Naturally, any rod and reel assembly generally indicated as 22 in FIG. 1, could be used or any other applicable fishing means could also be utilized with the release mechanism 10 of the present invention. The mechanism 10 itself comprises a body 24 having a connecting means 26 attached to one end so as to connect the mechanism to any applicable positioning means 14 as generally described above. In this particular embodiment the connecting means 26 merely comprises a flange connected to the rear end of the body with an aperture 28 formed therein such that a connecting line 29 may be attached thereto.

Referring again to FIG. 2, the front portion of the body may be configured into a housing 30 so as to have mounted therein or connected thereto a holding means generally indicated as 32. The holding means shown in FIGS. 2, 4 and 5 comprises one or more plates 34 each having a plurality of fingers 36 movably positioned in spaced apart, opposed, substantially co-planar relation to one another. The movement of the fingers 36 relative to one another may be accomplished by forming the plate 34 from a plastic or applicable material having sufficient natural resiliency to allow spring-like movement of the fingers towards and away from one another depending upon their relative location. As best shown in FIGS. 2 and 3, the fingers 36 of each plate are collectively disposed relative to one another to define a socket-like area 38 in which a bead member 40 may be mounted. This bead member 40 will be specifically described in detail hereinafter with particular reference to FIGS. 8-10. However, the bead member 40 is a portion of the line engaging means as shown in these FIGS. 8-10.

As shown, bead 40 is detachably mounted or held within the socket 38 formed by the fingers 36. The degree of force required to dislodge bead 40 from the socket, through the space 39 defined between the extremities of each of the fingers depends upon the distances which the fingers 36 are arranged apart from one another. This, in turn, is regulated by the tension adjusting means 42 shown in FIG. 2.

The tension adjusting means in the particular embodiment of FIG. 2 comprises a sleeve-like member telescopically arranged relative to the barrel portion 43 of body 24. A screw threaded connection 44 is provided between the interior surface of sleeve 42 and the exterior surface of barrel 43 of the body. This allows movement of the sleeve towards and away from the remainder of the body 24 as shown by directional arrow 46. Sleeve 42 further comprises an aperture 48 formed in its base within the surface 50 defining the aperture and is inclined or angled to correspond to the outer edge or surface of each of the fingers 36. By virtue of this arrangement, a sliding engagement or contact is provided between these engaging surfaces. It can readily be seen that movement of sleeve 42 inwardly towards the remaining or rearward portion of body 24 causes a wedging action on the finger thereby pushing them towards one another and applying a great gripping or connecting force to bead 40. It is obvious therefore, that a greater force would be required on portion 13 of line 12 to remove the bead from the socket 38 defined by the fingers. This force is of course applied when the fish hits bait 18. Movement of sleeve 42 in the opposite direction allows the fingers to be moved away from one another due to the natural resiliency of the material from which the fingers are formed.

Turning to the embodiment shown in FIG. 6, the mechanism 10 comprises a body having a pair of legs 52 and 54 fixedly secured at one extremity by the connecting means 56. This connecting means, as shown, may be in the form of a conventional connector assembly such as a screw and/or bolt combination 58, 60 extending through the extremity. The opposite extremity generally indicated as 62 of the mechanism has each of the legs 52 and 54 arranged in spaced apart relation to one another. The holding extremity in this embodiment is defined by tongue members 64 and 66 specifically configured to form an indentation 68 corresponding to the shape of the bead member 40. A tension adjusting means generally indicated as 70 is in the form of a conventional screw threaded fastener 72 cooperating with a counter bore 74 and including a biasing spring 76 to naturally force the legs 52 and 54 towards one another and in clamping relation to bead 40. As shown by directional arrows 78 movement or adjustment of the connectors 72 and 74 towards and away from one another causes the extemity 62 of legs 52 and 54 and the holding means 64 and 66 to move towards and away from one another in a somewhat pivotal direction as shown by directional arrows 80. This, of course, regulates the clamping force of the socket 68 about bead 40.

Figure 8:
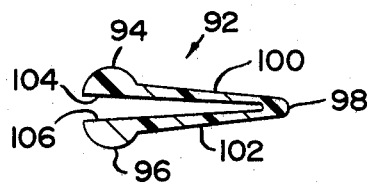
FIG. 8 is a sectional view of one embodiment of the line engaging means.
Figure 9:
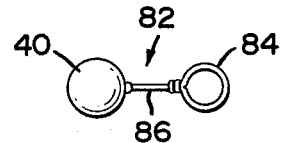
FIGS. 9 and 10 are alternate embodiments of the line engaging means.
Figure 10:
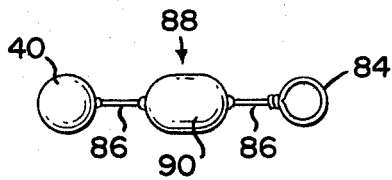

Regardless of which embodiment of the release mechanism is used, the line engaging means may have various structural differences with basic similar configurations as shown in FIGS. 8-10. More particularly, FIG. 9 shows a line engaging means generally indicated as 82 having bead 40 connected to eyelet 84 by means of a connecting pin 86 which may be integrally attached to either the eyelet or bead 40. The eyelet 84 surrounds line 12 and allows the line to move relative to the line engaging means 82 and, of course, the release mechanism 10 to which it is attached.

FIG. 10 discloses an embodiment of the line engaging means wherein bead 40 and eyelet 84 are interconnected by a swivel means 90 wherein connecting pins 86 are attached to each extremity of swivel means 90 and to the eyelet and bead 84 and 40 respectively. This structure allows eyelet 84 to rotate or move relative to bead 40.

Referring to FIG. 8, yet another embodiment of the line engaging means generally indicated as 92 comprises a substantially V-shaped member formed of one piece and including hemispherical bulbs or the like 94 and 96. The opposite extremity of the V-shaped body is defined by hinge 98 which allows arms 100 and 102 to move towards and away from one another. When surfaces 104 and 106 are forced into engagement with one another bulbs 94 and 96 form a bead like or spherical configuration equivalent to bead 40 of the embodiments shown in FIGS. 9 and 10. This formed bead is configured by virtue of the configurations of bulbs 94 and 96, to fit within the socket 38 or 68 depending upon the particular embodiments of the mechanism used. Also, the line 12 to be released fits within or between arms 100 and 102 and when the V-shaped body is closed these legs serve to clamp the line 12 therebetween in a substantially fixed relationship to the line engaging means 92. This occurs, of course, when the bulbs 94 and 96 are placed within the socket of the line release mechanism. Upon a force being exerted on line 13 sufficiently to dislodge the line engagement means 92 from the holding means, the line will pass between bulbs 94 and 96 and the line engagement means 92 will be discarded. Accordingly, it is important to note that this particular line engagement means is made from a material which has the flexibility of being pivoted about hinge 98 and also allows its manufacture to be accomplished at a reduced cost to make its discard economically feasible.

Figure 11:
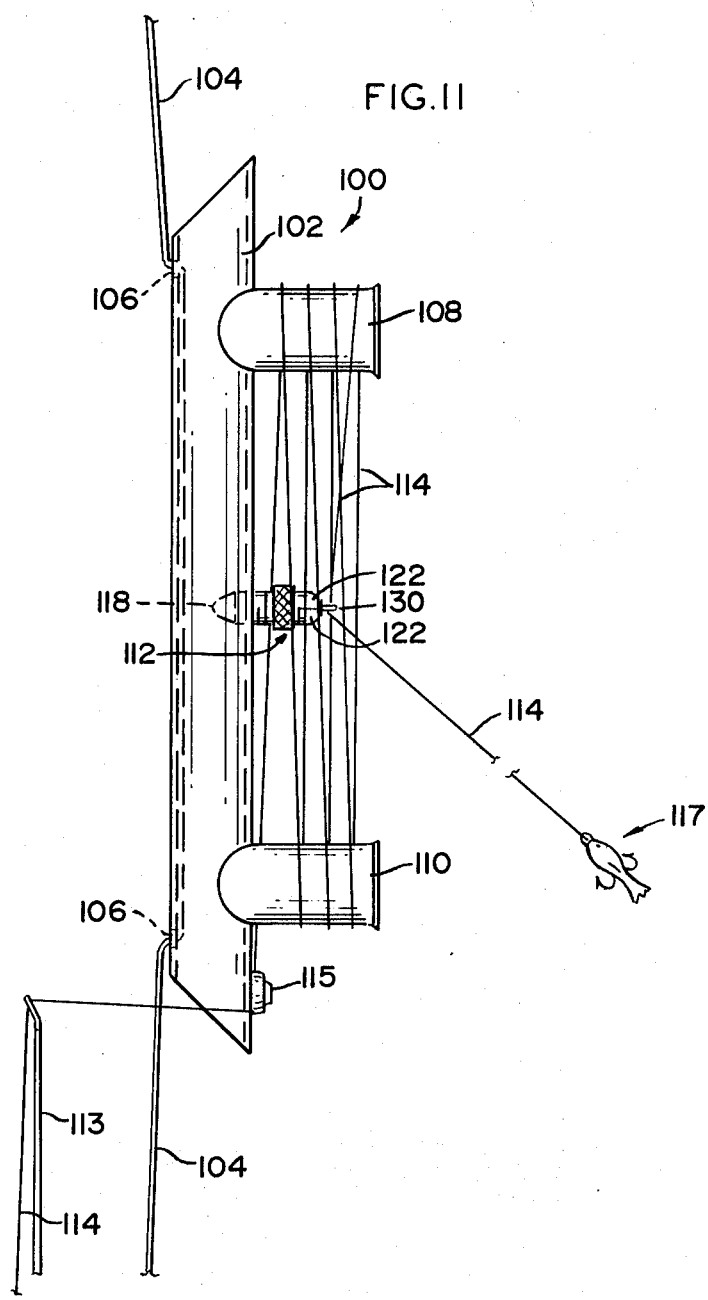
FIG. 11 is a side view of one embodiment of an outrigger structure and release mechanism attached thereto.

As shown in FIG. 11, another embodiment of the present invention comprises an outrigger structure generally indicated as 100. The outrigger structure comprises a base portion 102 having a substantially elongated configuration and which may be structured in the form of a hollow tube. A connecting line 104 serves as a supporting means to mount and support the outrigger 100 and includes a pair of apertures 106 arranged in spaced relation to one another adjacent opposite ends of the base portion 102. The supporting line or cord 104 interconnects the apertures 106 by being strung therebetween wherein a portion of the line 104 is arranged on the interior of the tubular base 102. Outwardly extending line supporting fingers 108 and 110 are arranged adjacent opposite ends of the base 102 and extend outwardly therefrom in substantially perpendicular relation to the longitudinal axis of base portion 102. These fingers 108 and 110 may be structured generally similar to the base 102 in that they may be substantially tubular and hollow. This hollow tubular structure is advantageous both from an economical manufacturing standpoint and the fact that the outrigger itself is light in weight, easily transported and can be assembled and/or manufactured in a minimal amount of time and expense.

Figure 12:
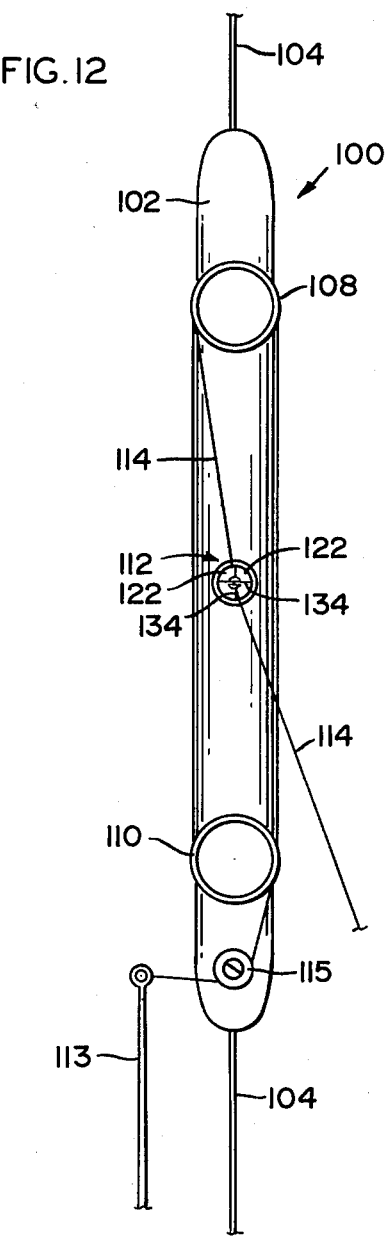
FIG. 12 is a front plan view of the embodiment shown in FIG. 11.
Figure 13:
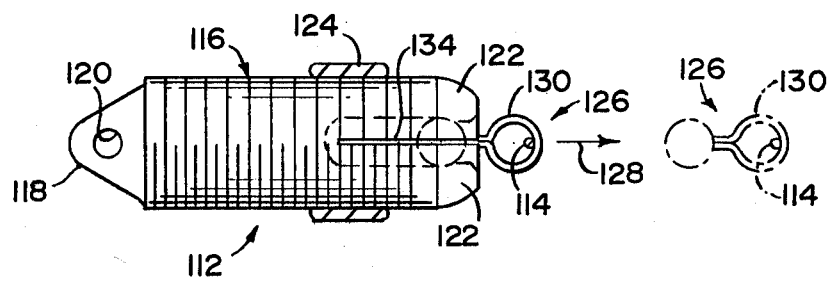
FIG. 13 is a detailed view of an embodiment of a release mechanism which may be used in combination with the outrigger structure of FIGS. 11 and 12.

An embodiment of a release mechanism of the present invention is shown in detail in FIG. 13 and in operatively mounted position in FIGS. 11 and 12. This release mechanism is generally indicated as 112 and it is fixedly mounted substantially transverse to the opposite ends of the base portion 102 intermediate or between the outwardly extending fingers at 108 and 110. The position of release mechanism 112 is such that fish line 114 may be wrapped around the fingers 108 and 110 as to be described hereinafter while at the same time being oriented in a substantially surrounding relation to the release mechanism 112.

Referring to the release mechanism itself, it comprises a body portion 116 having a substantially cylindrical configuration. A connecting flange 118 may be attached to the rear of the body portion as shown in FIG. 13 for connection to fishing apparatus when not specifically mounted on the outrigger structure 100 as shown in FIGS. 11 and 12. This flange 118 includes a connecting aperture 120 and may be mounted or tied to any fishing line, leader, etc. The forwardmost end of the housing 116 indicated here as the end opposite to that on which flange 118 is mounted, comprises a plurality of gripping fingers 122. These fingers may be substantially movable relative to one another due to the inherent flexibility of the material from which the body 116 and fingers 122 are formed. It will be noted in FIG. 13 that the fingers are integrally attached to the rest of the body and, in fact, cooperatively define the same cylindrical configuration as the remaining portion of the body 116. A tension adjusting means 124 is provided about the outer threaded surface of housing 116 and is capable of movement along the longitudinal axis thereof. This movement is possible by virtue of the internal surface of the tensioning means 124, which is formed in an annulus configuration, being threaded. This threaded configuration, of course, cooperates with the threaded exterior surface of body 116 so that rotation of the annulus 124 causes movement of the annulus over the outer surface of the body 116 in a direction substantially common to the orientation of the longitudinal axis of the body 116. As is readily apparent, movement of the annulus 124 towards the end of body 116 at which the fingers 122 are clearly defined, causes a restriction of the relative movement between the fingers. This, in turn, requires a greater force to remove the line engaging means generally indicated as 126 when this force is exerted along the directional arrow indicated as 128. Of course, the fishing line 114 or the like is attached to the eyelet 130 and the force is exerted to remove this line engaging means by a fish or the like pulling on line 114 as in the conventional manner.

The preferred embodiment of the release mechanism shown in FIG. 13 comprises at least four fingers 122 defined or formed in the body 116 by virtue of slots 134 being formed such that the plan of the slots are arranged in perpendicular relation to one another. This is shown in FIG. 12 wherein slots 134 define four fingers 122, all of substantially equal dimensions.

In operation, line 114 from a conventional fishing rod or like apparatus 113 is strung onto line engaging means 115 securely attached to the base portion 102 as shown in FIG. 11. From here, the line 114 is continuously wrapped about the spaced apart fingers 108 and 110 in a maner such as to at least partially surround the release mechanism 112. The line is then threaded to the line engaging means, through eyelet 130 attached to the release mechanism 112. From here the line 114 extends out into the water wherein a conventional bait or the like 117 is attached thereto. Obviously, upon a strike by the fish onto bait 117 sufficient force is exerted on the line engaging means 126 so as to remove it from the body 116 and more particularly from between the fingers 122. This causes an immediate and free unravelling of the line 114 from about the fingers 108 and 110.

It will thus be seen that the objects made apparent from the preceding description, are efficiently attained and since certain changes may be made in the above article without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described and all statements of the scope of the invention, which as a matter of languzge might be said to fall therebetween.

Now that the invention has been described,
What is claimed is:

1. A line release means used in combination with outrigger means, said release means fixedly attached to said outrigger means intermediate its ends; said outrigger means comprising substantially elongated, substantially hollow tubular base means including a plurality of substantially hollow tubular finger means rigidly affixed to and outwardly extending from said elongated base means and oriented substantially perpendicular to the longitudinal axis thereof; said base means further comprising a plurality of aperture means arranged in spaced relation and substantially aligned whereby a support element is connected between said apertures in supporting relation to said base means.

2. A line release means as in claim 1 comprising a body including means for attaching said line release means to said outrigger means, holding means connected to said body means, tension adjusting means movably connected to said holding means, line engaging means detachably connected to said holding means and interconnecting the line to said body means, whereby activating said adjusting means regulates the force of connection between said holding means and said line engaging means.

3. A line release means as in claim 2 wherein said body comprises a substantially cylindrical configuration, a plurality of gripping finger means integrally formed on said body means and configured to cooperatively conform to said cylindrical configuration, said gripping finger means oriented to define a holding area for said line engaging means; said tension adjusting means movably mounted on the exterior of said body means and movable along the longitudinal axis of said body means contiguous to said gripping finger means.

4. A line release means as in claim 3 wherein said gripping finger means are defined by at least one slot means formed in said body means.

5. A line release means as in claim 3 wherein said tension adjusting means comprises annulus means being integrally threaded and movably mounted on the exterior of said body means, whereby the orientation of said annulus means determines the movability of said gripping finger means relative to one another and thereby the force required for the removal of said line engaging means.

* * * * *

UNITED STATES PATENT OFFICE
CERTIFICATE OF CORRECTION

Patent No. 3,892,083  Dated July 1, 1975

Inventor(s) Carmen A. Peterson

It is certified that error appears in the above-identified patent and that said Letters Patent are hereby corrected as shown below:

Column 5, line 58, delete "extremity" and insert therefore -- means --.

Signed and Sealed this twenty-first Day of October 1975

[SEAL]

Attest:

RUTH C. MASON
Attesting Officer

C. MARSHALL DANN
Commissioner of Patents and Trademarks